Figure 1:
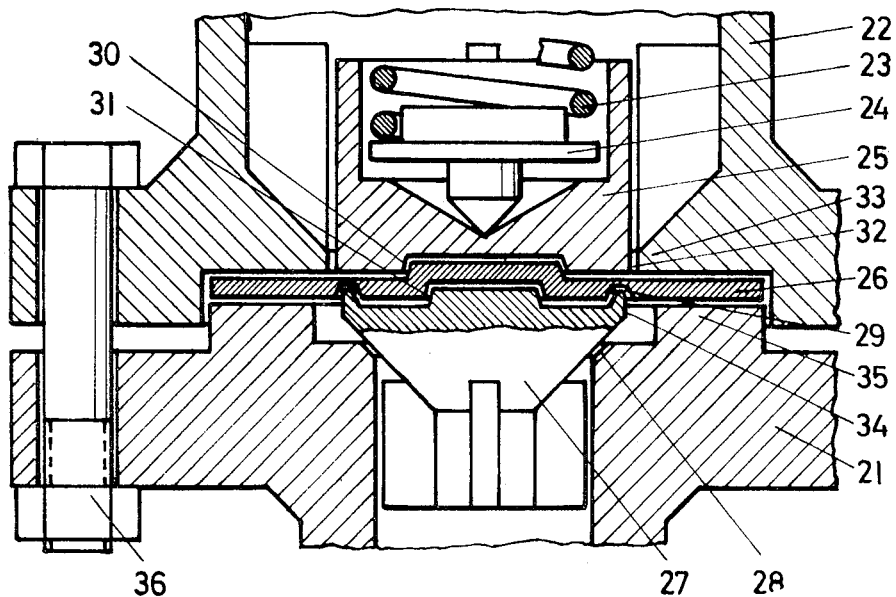

United States Patent

[11] 3,623,495

| [72] | Inventor | Karl Friedrich Erb<br>Demollstrasse 3, 8 Munich 19, Germany |
|---|---|---|
| [21] | Appl. No. | 680,137 |
| [22] | Filed | Nov. 2, 1967 |
| [45] | Patented | Nov. 30, 1971 |

[54] PRESSURE-RELIEF VALVE AND DIAPHRAGM FOR SUCH VALVE
4 Claims, 2 Drawing Figs.

[52] U.S. Cl. .................................................. 137/69,
220/89
[51] Int. Cl. .................................................. F16k 17/16
[50] Field of Search .......................................... 220/89 A;
137/68–71, 53.15 UX

[56] References Cited
UNITED STATES PATENTS
| 1,533,839 | 4/1925 | Egeland | 137/68 X |
| 3,397,712 | 8/1968 | Boroson | 137/68 |
| 1,665,391 | 4/1928 | Willoughby | 137/69 |
| 2,552,110 | 5/1951 | Otis et al. | 220/89 A |
| 2,932,308 | 4/1960 | Erb | 137/70 |

FOREIGN PATENTS
| 953,395 | 11/1956 | Germany | 137/71 |

Primary Examiner—William F. O'Dea
Assistant Examiner—Richard Gerard
Attorney—Wolfgang G. Fasse ABSTRACT: According to the invention the present pressure relief or safety valve comprises a diaphragm having an oversized thickness but with a groove in such a diaphragm to facilitate the rupture of the diaphragm. The valve may be equipped with upper and/or lower grooving means for pressing or cutting such groove into the diaphragm.

PATENTED NOV 30 1971 3,623,495

INVENTOR.
Karl F. Erb
BY

PRESSURE-RELIEF VALVE AND DIAPHRAGM FOR SUCH VALVE

The present invention relates to pressure relief valves, more particularly to diaphragm safety valves, and to diaphragms for such valves. The diaphragm in these valves is arranged so that it provides a good seal across a gap between a valve seat and a valve closure member which closes a passage through the valve. The diaphragm will rupture as soon as the closure member is lifted off its seat in response to a pressure which exceeds a predetermined pressure.

The diaphragm has an outer rim portion surrounding a central portion. The rim is clamped into proper position by valve housing members and the central portion is supported by said closure member which either rests on the valve seat or which closes a passage through the valve like a piston. In the latter instance a second, auxiliary closure member is provided on the other side of the diaphragm, said second closure member being seated on a valve seat. In both instances the closure member moves to open the valve. Due to such movement the central portion of the diaphragm will be severed from the clamped rim portion thereby providing the pressure relief.

The forces available for severing the diaphragm are relatively small. Therefore, the diaphragms which have been used heretofore, have usually a thickness of but a few 100th of a millimeter. Due to such thinness it is difficult to produce such diaphragms without pores. Besides, in handling such thin diaphragms they are easily damaged and the operating pressure subjects the diaphragm continuously to substantial forces along the gap which is covered by the diaphragm.

Further details with regard to such prior art valves are in my U.S. Pat. No. 2,932,308 which issued on Apr. 12, 1960.

In view of the above it is an object of this invention to provide an improved pressure relief or safety valve and diaphragm which diaphragm may have a thickness substantially larger than the thickness heretofore required for proper rupture upon pressure relief and which diaphragm will rupture properly in spite of its larger thickness.

It is yet another object of this invention to provide the pressure relief valve with means which will assure the proper rupture of such thicker than normal diaphragm.

A further object of the invention is to provide said diaphragm with a rupture groove and the valve with members for cutting or pressing such grooves into the diaphragm.

Yet another object is to provide the diaphragm with a groove which has a bottom thin enough to assure proper rupture. It is still another object of this invention to clamp the diaphragm in such a manner in the valve housing that said groove with its profile is supported by a valve member positioned close to said gap between the closure member and the valve seat.

It is yet another object to provide a recess in a valve housing member which recess may receive any excess diaphragm material when such grooves are formed during assembling the valve.

Basically the above objects have been achieved in accordance with the invention by cutting or pressing such rupture groove, preferably of circular shape, into the diaphragm either prior to installing the diaphragm in the valve housing or while installing it. In the latter instance an edge of the clamping means in an upper or lower valve housing member or a valve closure member may be provided with a groove cutting or pressing element which will penetrate into the material of the diaphragm as the upper and lower valve housing members are fastened to each other. In any event, such diaphragm may now have a thickness which corresponds to two to ten times the thickness of the groove bottom which will be served upon response of the valve to an excess pressure.

Figure 2:
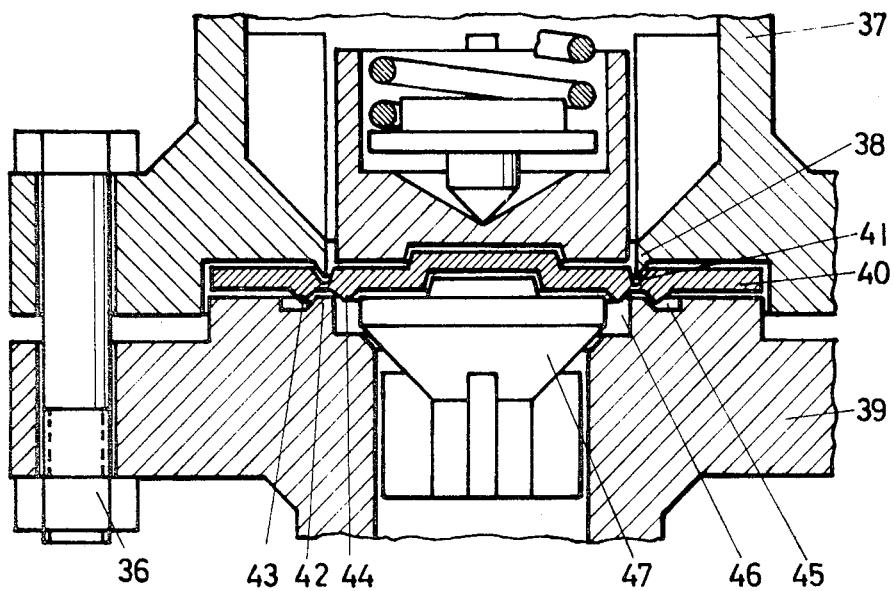

In order that the invention may be clearly understood it will now be described, by way of example, with reference to the accompanying drawings, wherein:

FIG. 1 shown an embodiment of the invention, particularly illustrating the center portion of the valve with an auxiliary closure member;

FIG. 2 shows a modification of the embodiment of FIG. 1.

It should be noted that in the drawings for the sake of clarity, the diaphragm and some of the dimensions of the valve members adjacent to the diaphragm have been shown in an enlarges scale. In FIG. 1 a lower valve housing member 21 and an upper valve housing member 22 of a diaphragm safety valve are shown with nonessential parts broken away. A disk 24 which is biased by a spring 23 presses a piston-shaped closure member 25 and the grooved diaphragm 26 against an auxiliary closure member 27 which in turn rests against the valve seat 28. The diaphragm 26 has a thickness of about one-tenth of a millimeter and comprises rupture groove 29, having a sectional area in the shape of the rhombus. The bottom of the groove rests against the closure member 25. This has the advantage that the weakest portion of the diaphragm is substantially relieved of the operating pressure.

The closure member 25 has a recess with sidewalls 30 having conic surfaces into which fits a conical protrusion of the diaphragm. The auxiliary closure member 27 also has a conical protrusion with sidewalls 31 which fit into a corresponding recess in the diaphragm. This arrangement serves for centering the diaphragm in the valve housing. A gap 32 between the closure member 25 and the upper valve housing passage 33 is covered by the full thickness of the diaphragm 26.

The auxiliary closure member 27 as shown in FIG. 1, is provided with a circumferential rib 34 which reaches into the groove 29 of the diaphragm. The lower housing member 21 is provided with a clamping shoulder 35 which is spaced from the gap 32 by a distance having at least several times the thickness of the diaphragm to provide for proper clamping when the upper and lower housing members are connected to each other, for example, by means of bolts and nuts 36.

FIG. 2 illustrates an embodiment similar to that of FIG. 2. However, in FIG. 2 the upper housing member 37 is provided with a ring-shaped pressing or cutting edge 38 which will be pressed into the diaphragm 40 of relatively soft material, when the lower and upper housing members 39 and 37 are pressed against each other, for example, by means of bolts and nuts 36, whereby the desired rupture groove 41 is formed by the cutting edge 38 pressing a portion of the diaphragm against a pressure surface 42 which supports the diaphragm opposite the cutting edge. Depending upon the cross-sectional shape of the cutting edge 38, the rupture groove 41 will have a V-shaped cross section or such cross section may have the shape of a rhombus.

The lower housing member 39 is provided with recesses 45 and 46 into which any excess diaphragm material as shown at 43 and 44 may escape while the groove 41 is being pressed.

The embodiment of FIG. 2 also assures that the rupture diaphragm will be subject to a very low stress during normal operation because the cutting rib 38 directly supports the bottom of the groove 41 against the pressure exerted by the medium under pressure on the diaphragm.

Another advantage of the cutting or grooving edge 38 is seen in that it assists in properly securing a position of the diaphragm within the valve housing in that it assists in the severing of the diaphragm along the groove upon reaching the relief pressure valve.

Another advantage of the cutting edge is seen in that the groove does not have to be fabricated prior to the use of the diaphragm. In this instance, a diaphragm without a groove may be pressed against the surface 42 of the lower housing member 39 whereby the respective groove 41 is easily formed, particularly, where the diaphragm material is a relatively soft material such as lead, aluminum or silver.

Where diaphragms are used which are manufactured with the groove in them, the centering of the diaphragm within the valve housing is facilitated by such conical-centering surfaces as shown in FIGS. 1 and 2 which illustrate double centering surfaces at the top and bottom surface of the diaphragm. A single centering surface or recess would also be sufficient, particularly, where a cutting or grooving edge facilitates the centering of the diaphragm.

In order to provide for some yieldability of the diaphragm perpendicularly to its surface, there is provided a spacing between the clamping shoulder 35 and the gap 32, such spacing will correspond to several times the full thickness of the diaphragm.

As mentioned, the preferred cross section of the rupture groove has a V-shape or the shape of a rhombus. However, the invention is not limited to these two examples. In order to reduce tension resulting from the formation of the groove it may be desirable to press the groove by a pressing stamp which has been heated to an elevated temperature.

What I claim is:

1. In a pressure-relief valve having a valve housing with a valve seat therein, an inlet port and an outlet port, a passage through said housing interconnecting said ports, a diaphragm, a valve closure member mounted in said housing for reciprocation therein and having a diaphragm-facing surface for supporting the diaphragm against the pressure in the valve, bias means for pressing the valve closure member against the valve seat, said diaphragm being clamped into position in said valve housing for sealing any leakage across a gap between said closure member and the valve housing, said diaphragm having a surface facing toward said outlet port and resting against said diaphragm-supporting surface of said valve closure member, said diaphragm being adapted to rupture in response to unseating of said closure member from said valve seat when a predetermined pressure is exceeded, the improvement comprising a rupture groove in said diaphragm, said groove being located adjacent to and at least partially opposite said gap and having a bottom sufficiently thin to facilitate the rupture of the diaphragm along the groove, said diaphragm having a thickness corresponding to several times that of said thin groove bottom said thickness being sufficient to facilitate the production and handling of said diaphragm, said rupture groove having groove walls, said valve further comprising means which rest directly against at least one of said groove walls.

2. The pressure-relief valve according to claim 1, wherein said last mentioned means is an auxiliary closure member located in the valve housing for cooperation with the valve seat and having a circumferential rib which reaches into the groove and rests directly against at least one of said groove walls for also supporting the diaphragm against the pressure in the valve.

3. The pressure-relief valve according to claim 1, wherein said last-mentioned means is a cutting edge forming part of the valve housing and located to surround said passage through the valve housing, said cutting edge having a pointed ridge for penetrating into said diaphragm to form said groove when the diaphragm is installed in the valve, and an edge surface for resting directly against at least one of said groove walls for also supporting the diaphragm against the pressure in the valve.

4. The pressure-relief valve according to claim 3, further comprising at least one recess in the valve housing, said recess being located opposite said groove and opposite the cutting edge but slightly radially displaced relative to the groove so as to extend sufficiently close to the thin groove bottom so that excess diaphragm material may escape into the recess while the groove is being pressed by said cutting edge.

* * * * *